(12) United States Patent
Ruckle

(10) Patent No.: US 6,913,085 B2
(45) Date of Patent: Jul. 5, 2005

(54) SINGLE STANDARD DOUBLE DISK CONFIGURATION

(75) Inventor: Jarrod Ray Ruckle, Bondurant, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/437,754

(22) Filed: May 14, 2003

(65) Prior Publication Data

US 2004/0245004 A1 Dec. 9, 2004

(51) Int. Cl.⁷ .............................................. A01B 15/16
(52) U.S. Cl. ..................................... 172/574; 111/164
(58) Field of Search ................................ 172/518, 540, 172/545, 548, 549, 551, 556, 574, 575, 576; 111/163, 164

(56) References Cited

U.S. PATENT DOCUMENTS

| | | | |
|---|---|---|---|
| 889,486 A | 6/1908 | Colter | |
| 3,173,498 A | * 3/1965 | Heilbrun | 172/540 |
| 3,640,348 A | * 2/1972 | Womble | 172/572 |
| 4,295,532 A | * 10/1981 | Williams et al. | 172/184 |
| 4,407,372 A | * 10/1983 | Rozeboom | 172/572 |
| 4,779,684 A | * 10/1988 | Schultz | 171/62 |
| 4,896,443 A | * 1/1990 | Klingler et al. | 37/367 |
| 5,080,178 A | * 1/1992 | Dietrich, Sr. | 172/153 |
| 5,482,120 A | * 1/1996 | Lloyd | 172/21 |
| 5,588,382 A | * 12/1996 | Embree et al. | 111/139 |
| 5,660,126 A | * 8/1997 | Freed et al. | 111/140 |
| 5,957,217 A | * 9/1999 | Gunnink | 172/166 |
| 6,082,276 A | * 7/2000 | Klein et al. | 111/164 |
| 6,158,523 A | 12/2000 | Gengler | 172/574 |
| 6,279,666 B1 | * 8/2001 | Nikkel et al. | 172/574 |
| 6,431,287 B1 | * 8/2002 | Ramp | 172/133 |

FOREIGN PATENT DOCUMENTS

FR 2562376 * 10/1985

* cited by examiner

Primary Examiner—Robert E. Pezzuto
Assistant Examiner—Nathan Mammen

(57) ABSTRACT

A double disk C-spring standard assembly utilizes bearings mounted to a simple carrier plate. The plate is connected to the lower end of a single C-spring oriented in the fore-and-aft direction. Bearing assembly mounting holes in the plate define the necessary gang angles. Compact disk blade hub assemblies facilitate side-by-side mounting of the center bearing assemblies.

17 Claims, 4 Drawing Sheets

SINGLE STANDARD DOUBLE DISK CONFIGURATION

FIELD OF THE INVENTION

The present invention relates generally to bearings for agricultural disk blades and, more specifically, to a disk blade assembly for working the soil at the juncture of angled disk gangs.

BACKGROUND OF THE INVENTION

Recently developed combination tillage implements have employed disk blades with individually mounted bearing blade assemblies which are able to run in wetter fall soil conditions. Many of the combination tillage implements include bulky C-spring standards supporting angled gang tubes which meet in at the implement center. The C-springs are angled toward one another, and mounting requirements for the springs force the center blades to be more widely spaced than desired. The wide spacing of the center blades results in an inadequate cut of the soil at the center of the machine. The center disk spacing problem typically is overcome either by employing a special standard bearing assembly to mount two disk blades or by utilizing an intermediate short gang tube in the middle to carry the two disk assemblies. Both solutions require a costly weldment or assembly.

The disk blade bearings are subjected to high loads in a severe environment. Bearing seal failure leading to premature bearing failure has been an ongoing problem. For years, the main attempt at a solution to the problem has been the utilization of a grease fitting with frequent scheduled greasing to flush contaminates out of the bearing. For most disk gang bearing applications, frequent greasing has been a generally acceptable practice since each bearing normally supports from three to six blades and the grease fittings are reasonably accessible. However, the frequent greasing is time-consuming and reduces the productivity of the implement. Machines with individually mounted blades create two new problems relative to the grease method of flushing the bearings. First, wetter field conditions are harder on the seals. Mud packs into the seal area and ultimately works into the bearing to cause permanent damage to the seals.

To overcome the mud problem, the frequency of required re-greasing to flush the contaminates and prevent bearing failure has to be increased. The individually mounted blade bearing assemblies result in more bearings to carry the same number of blades as a disk gang. The combination of more grease fittings to grease and an increased maintenance frequency results in a difficult time-consuming maintenance chore. In addition, the mounting requirements for the C-springs force the center blades to be more widely spaced than desired adjacent the juncture of the angled tubes supporting the C-springs results in an uneven tillage pattern near the center of the machine.

SUMMARY OF THE INVENTION

A double disk C-spring standard utilizes the bearing assemblies mounted to a simple carrier plate. Bearing assembly mounting holes in the plate define the necessary gang angles. Compact disk blade hub assemblies facilitate side-by-side mounting of the center bearing assemblies. The plate is connected to the lower end of a single C-spring oriented in the fore-and-aft direction. The C-spring is supported from the implement frame utilizing front to rear tie plate and two-hole straps both added to the outsides of gang tube half connecting plates.

The mounting system is compact and economical. Bearing assemblies identical to those used on the remainder of the machine can be used on double C-spring standard. An even soil cut is obtained at the juncture of angled gang tubes without need for costly and cumbersome special two disk bearing assemblies or an intermediate short gang tube. A simple fore-and-aft C-spring orientation provides necessary support for two center cutting disks. The spring section does not need to be heavier than on a single disk system since the primary force is thrust load and the double disk C-spring actually sees less resultant load since the thrust loads of the two mounted disks are substantially equal and opposite and therefore balance out.

The bearing mounting facilitates supporting two disk closely together at the tool-receiving end of the C-spring. If desired, the disks arrangement can be configured to be symmetrical about an upright fore-and-aft extending plane with each bearing housing terminating near the plane so that the housings do not interfere with each other.

These and other objects, features and advantages of the present invention will become apparent from the detailed description below in view of the drawings.

DESCRIPTION OF THE PREFERRED EMBODIMENT

Figure 1:
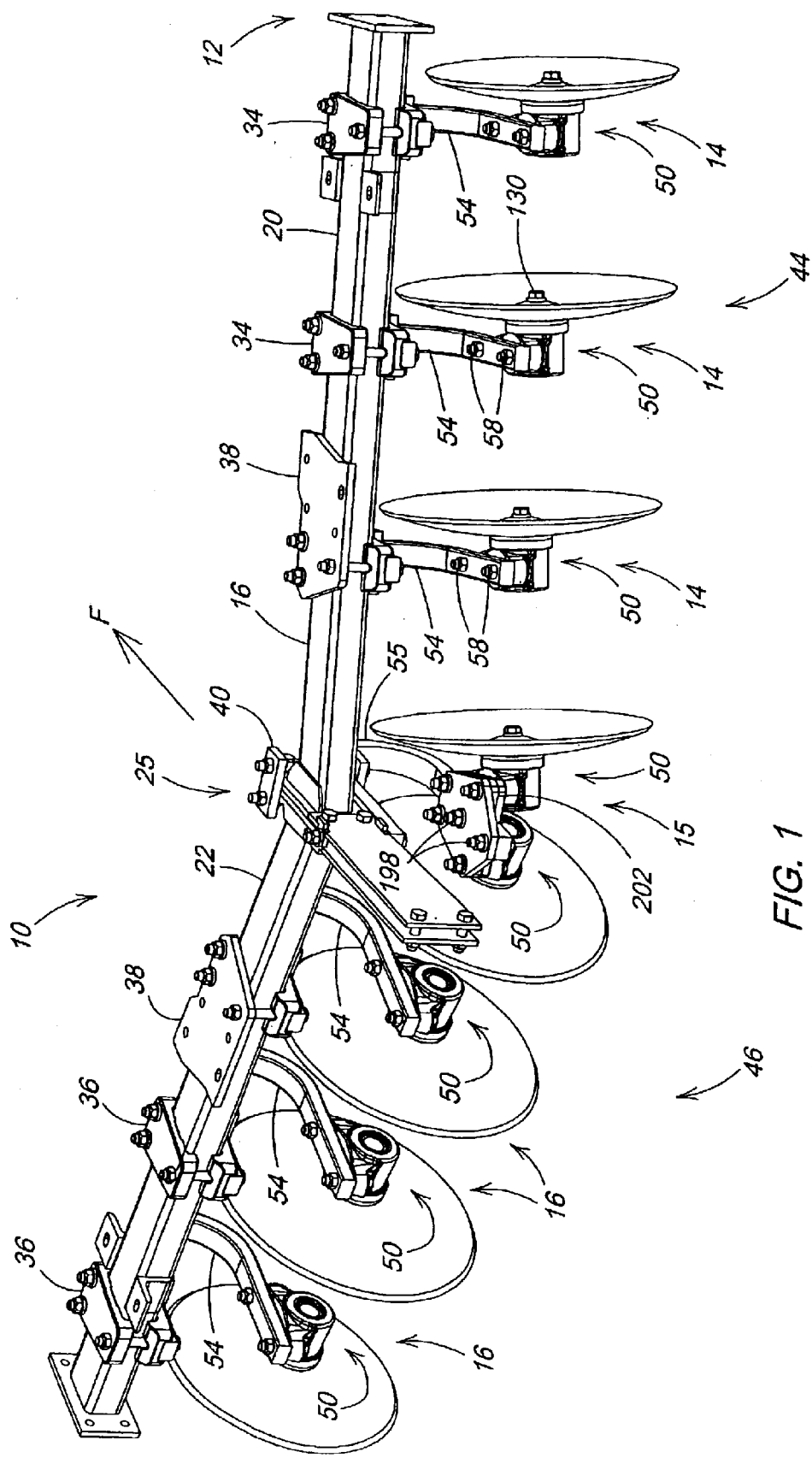
FIG. 1 is a perspective view of a portion of an agricultural implement having disk blade assemblies supported from converging gang tubes.

Referring to FIG. 1, therein is shown a portion of an agricultural tillage implement 10 such as a mulch ripper or other implement having a frame 12 supporting disk blade assemblies indicated generally at 14, 15 and 16. The implement frame 12 includes angled gang tubes 20 and 22 forming opposite halves centrally connected by gang tube plate bracket structure 25. Standard bracket structures 36, 38 and 40 connect the disk blade assemblies 14, 15 and 16 to the tubes 20 and 22 to generally define disk gangs 44 and 46 angled with respect to a direction transverse to the forward direction (F).

The disk blade assemblies 14, 15 and 16 are shown with identical disk bearing hub assemblies 50 (FIGS. 2 and 3) which are shown and described in copending and commonly assigned U.S. application Ser. No. 10/437,756 filed concurrently herewith and entitled Disk Blade Bearing Hub Assembly. The hub assemblies 50 are connected to the lower tool-receiving ends of curved shanks or C-springs 54 and 55 in either concave right (assemblies 14) or concave left (assemblies 15) configuration. The hub assemblies 50 are reversible on the C-springs, and therefore a single hub configuration may be utilized for all the assemblies 14, 15 and 16. The hub assembly for the blade assemblies 14 will be described in detail below, and it is to be understood that the hub configuration for the remaining assemblies 15 and 16 is generally identical. Although shown with a cushion standards 58, the blade assemblies 14,15 and 16 can also be utilized with a rigid standard construction.

The uppermost end of the C-spring 54 is connected to the tube 20 by the clamp 34 (FIG. 1) in generally a fore-and-aft configuration with the C-spring opening in the rearward direction. The lower tool-receiving end of the C-spring approaches a horizontal orientation directly below the clamp 34 and is apertured at fore-and-aft spaced locations to receive a pair of mounting bolts 58 which connect the hub assembly 50 to the C-spring.

The hub assembly 50 includes a main housing 60 having a generally cylindrically shaped outer surface 62 with a first or blade-side end 64 and a second or innermost end 66. The upper portion of the main housing 60 includes forward and aft projecting apertured lugs 68 symmetrically arranged relative to the housing for receiving the mounting bolts 58 which secure the housing to the underside of the tool-receiving end of the C-spring 54.

Figure 2:
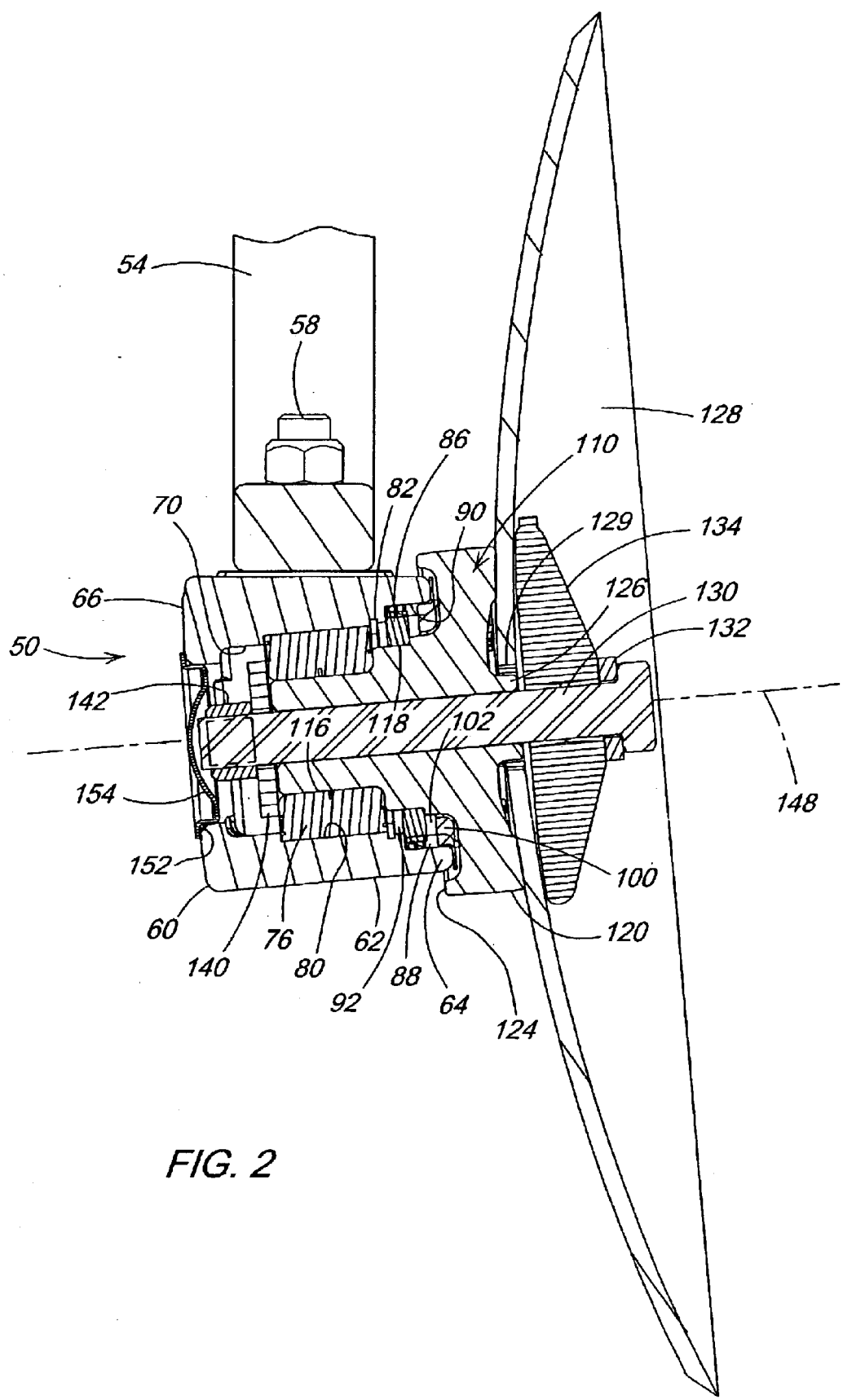
FIG. 2 is an enlarged sectional view of one of the disk blade assemblies shown in FIG. 1
Figure 3:
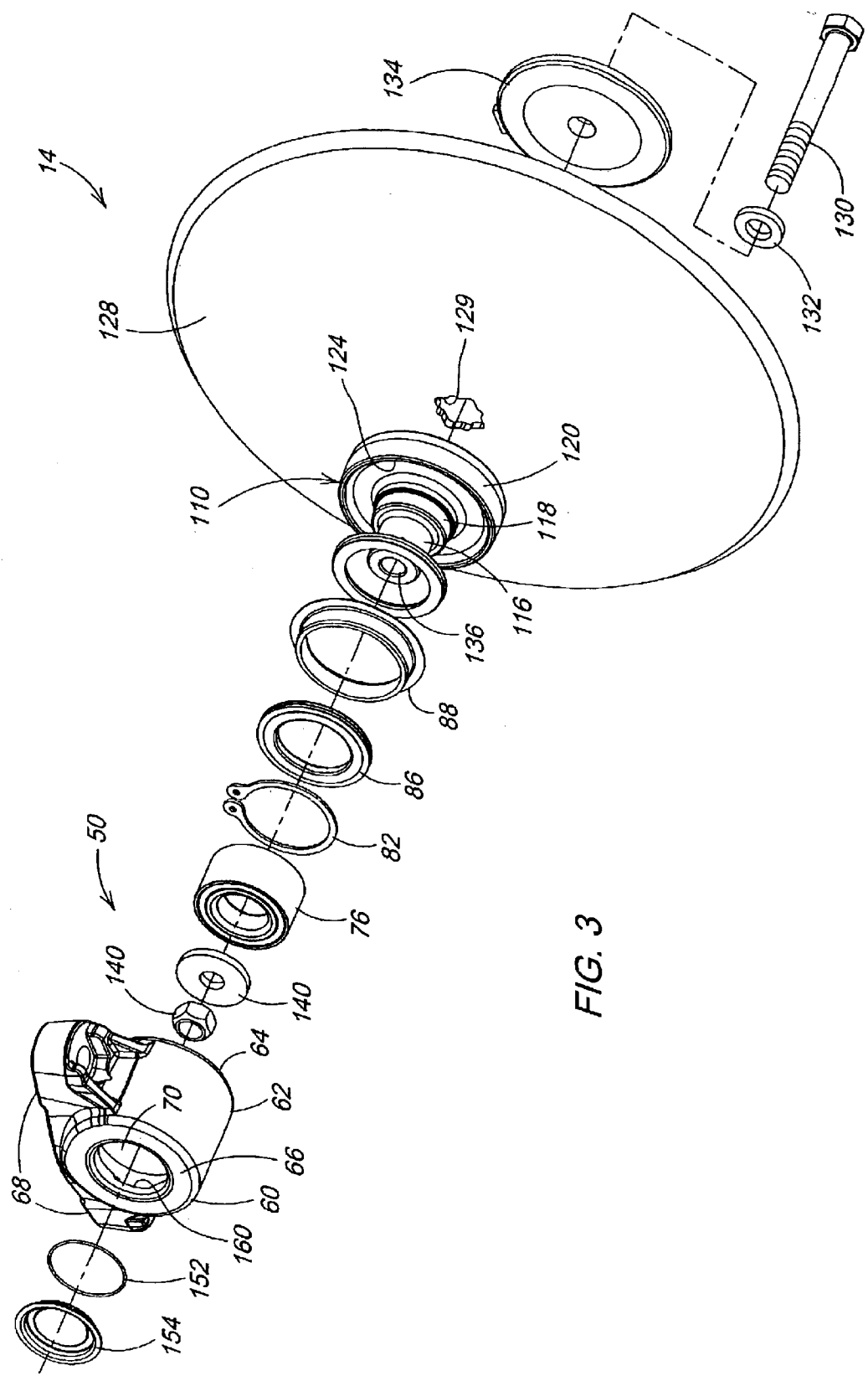
FIG. 3 is an exploded view of the disk blade assembly of FIG. 2.

The housing 60 includes a central stepped bore 70 extending from the first side 64 through to the second side 66. The bore is machined with the diameter of each section of the bore decreasing in diameter from the side 64 to the side 66. A factory sealed and preset double row tapered roller bearing 76, such as a Timken® UNIPAC™ bearing, is seated in a central machined section 80 of the bore 70 and secured therein by a snap ring 82 (FIG. 2). A seal such as a triple lip seal 86 and a seal cup 88 are located in a machined outer bore section 90. The seal 86 is offset axially outwardly of the outermost extremity of the tapered roller bearing 76 to define a grease-receiving cavity or area 92 adjacent the step between the sections 80 and 90 which provides an intermediate grease layer barrier reducing contaminants reaching the bearing 76. An annular plastic or Teflon® seal protector 100 is located at the opening in the side 64. An outer grease cavity or area 102 is defined between the seal protector and the seal 86.

A forged alloy steel spindle 110 having a stepped cylindrical surface extending into the bore 70 includes a machined innermost section 116 extending through the inner race of the bearing 76. The circumference of the spindle 110 increases at section 118 to extend radially outwardly around the outer end of the bearing 76 adjacent the snap ring 82 and supports the body or base of the seal 86. An outer section 120, having a diameter slightly greater than that of the section 118, extends to the end of the bore 70 in contact with the seal protector 100.

An enlarged outermost end of the spindle 110 includes a housing overlap portion 120 projecting radially outwardly of the first side 64 of the housing 60. The overlap portion includes a protective lip 124 extending in the axial direction towards the inner end of the spindle 110 at a location adjacent the outer surface 62 of the first side of the housing. A blade-receiving non-circular projection 126 projects axially outwardly from a central portion of the outermost end of the spindle 110 to support a conventional concave outwardly disk blade 128 via mating aperture 129.

A standard grade 8 bolt 130 extends through a washer 132, a blade clamp casting 134 and a central bore 136 in the spindle 110. The threaded end of the bolt 130 projects axially through the bore 136 beyond the innermost end of the bearing 76 but is protectively maintained within the bore 70 of the housing 62. A washer 140 is inserted over the threaded end, and a nut 142 is threaded onto the bolt to urge the washer against the end of the spindle 110 and against the inner race of the bearing 76. The headed end of the bolt 130 draws the blade clamp casting 134 against the blade 128 to sandwich the blade between the casting and the outermost end of the spindle 110. The bolt 130, blade 128, spindle 110 and inner race of the bearing 76 are constrained to rotate together about a disk blade axis 148.

The bearing 76 supports the spindle 110 and blade 128 for rotation about the axis 148. The lip 124 of the hub overlap portion deflects dirt and debris away from the seal protector 100 and prevents wrapping by stringy material such as vines and twine. The seal protector 100 keeps dirt and debris from pushing directly into external seal lips of the multiple lip seal 86. A layer of grease in the cavity 102 provides another barrier which protects the seal 86 from dirt and debris. The lip seal 86 provides positive sealing and is backed up by a grease layer barrier in the cavity 92. The hub overlap, plastic seal protector, multiple lip seal and grease barriers protect the seal of the bearing 76. The above-described bearing structure with protective arrangement has been shown to increase average bearing life many times over that of conventional disk bearing structures.

The back side of the bearing hub is also positively sealed using an O-ring 152 and dust cap 154. As best seen in FIG. 2, the cap 154 is recessed within the innermost end 66 of the housing 62 and protects the threads of the bolt 130 and the nut 142. The structure eliminates a large dust cap on the blade side of the assembly that would otherwise hinder scouring of the blade 128. The overall width of the bearing assembly is reduced to facilitate close side-by-side disk blade mounting near the center of a machine adjacent the intersection of gang tube halves as shown at 15 in FIG. 1.

To facilitate easy removal of the bearing 76 from the housing 62, the bore 70 includes inner ledge structure 160 near the innermost end 66 for facilitating support of a bearing removal tool within the housing. A screw-threaded insert (not shown) may be positioned against the ledge structure 160 and a bolt threaded into the bore 70. The bolt will contact and force the spindle 110 outwardly as the bolt is threaded into the bore. Thereafter, the procedure is repeated with an enlarged end placed on the bolt which contacts and forces the bearing 76 outwardly.

Figure 4:
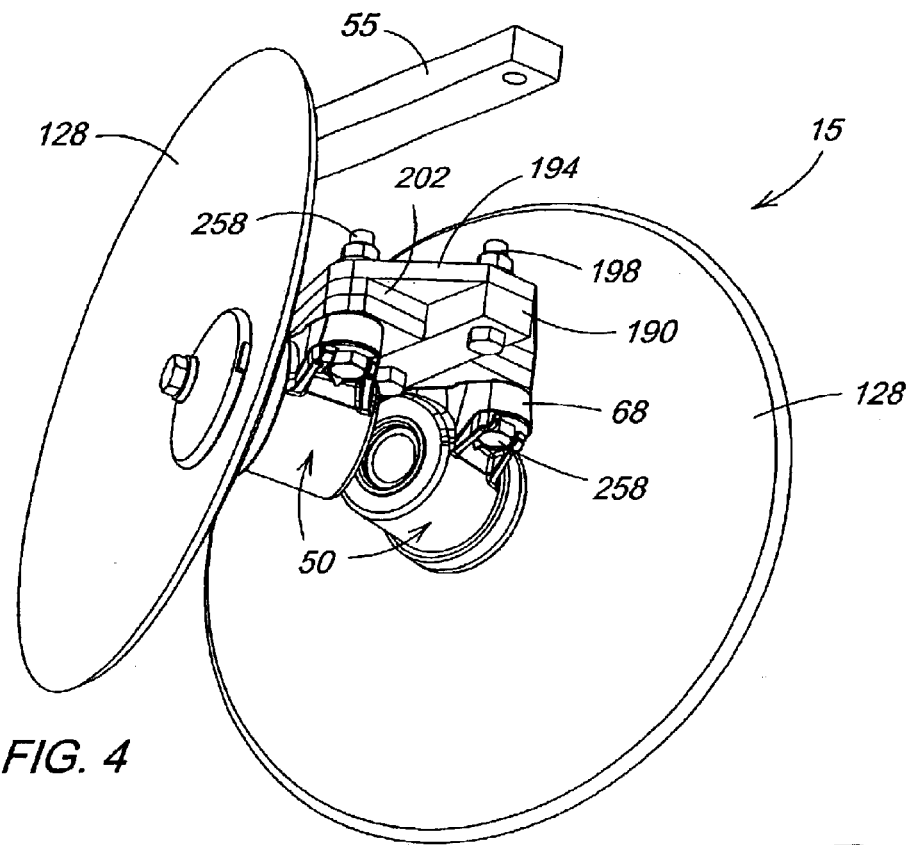
FIG. 4 is a lower front perspective view showing the single standard double disk structure adjacent the central gang tube connection in FIG. 1.
Figure 5:
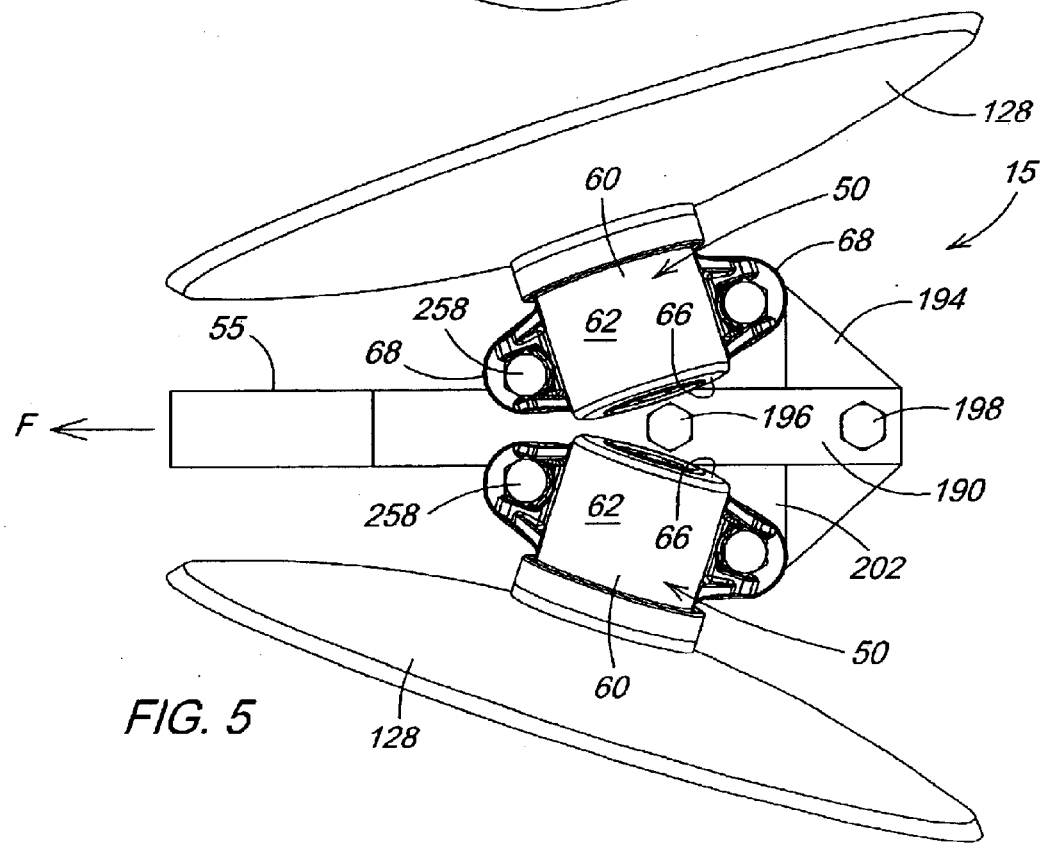
FIG. 5 is a bottom view of the disk structure of FIG. 4.

As shown in FIGS. 1, 4 and 5, the cushioned assembly 15 includes a C-spring oriented generally in the fore-and-aft direction and having an upper mounting end connected to the gang tube plate bracket structure 25 which secures the gang tubes 20 and 22 at a central location. The C-spring extends forwardly and downwardly from the connection with the bracket structure 25 and then curves rearwardly and terminates in a generally horizontal lower tool-receiving end 190 located below the aft portion of the gang tube plate bracket structure 25. An upper, apertured plate 194 having forwardly converging sides is fixed to the upper surface of the end 190 by two bolts 198. The apertures for the two bolts 198 are spaced a distance apart equal to the spacing between the bolts 58 on the assemblies 14 and 16 so that the same standards can be used for the single disk and double disk assemblies if desired.

Two sets of spacer plates 202 are sandwiched between the bottom surface of the plate 194 and the hub assemblies 50 on opposite sides of the end 190. The spacer plates 202 assure that the hub assemblies 50 are positioned at the same height above the ground whether connected is a single disk configuration directly to the end 190 (FIG. 2) or in a double disk configuration (FIG. 4) to the plate 194.

As shown, the plate 194 is symmetrical about a fore-and-aft centerline and includes pairs of housing bolt-receiving apertures lying on a line which angles inwardly in the forward direction to define opposite and generally equal disk gang angles which correlate with the disk gang angles defined by the gang tubes 20 and 22 (FIG. 1). The spacer plates have inner sides which abut the sides of the end 190 and include apertures corresponding to those in the plate 194. Bolts 258 extend through the apertures and secure the housings 60 to the standard 55. As best seen in FIG. 5, the forwardmost bolts 258 lie closely adjacent the sides of the end 190 and the innermost ends 66 of the housings are in close proximity to each other. The reduced width of the housings 60, substantially less than twice the width of the standard, and the plate mounting structure facilitate support of the disks 128 at an ideal spacing and angle relative to each other to work the soil below the center of the machine without need for a special standard or a short additional gang tube. The thrust loads of the two mounted disks are substantially equal and opposite and therefore balance out thereby reducing the thrust loads on the standard. The mounting bolts and the spindle bolts can be of conventional standard grade construction generally identical to each other to reduce component costs and number of different parts required.

Having described the preferred embodiment, it will become apparent that various modifications can be made without departing from the scope of the invention as defined in the accompanying claims.

I claim:

1. A double disk standard assembly adapted for movement through the soil in a forward direction comprising:
    an upright standard having an upper mounting end and a single lower tool-receiving end;
    a bracket connected to the tool-receiving end;
    first and second single disk blade assemblies including first and second bearing housings with innermost extremities and first and second spindles supported for rotation by the bearing housings, the spindles extending axially outwardly from the housings and supporting disk-blades;
    connector structure mounting the housings to the bracket with the disk blades spaced closely adjacent opposite sides of the tool-receiving end;
    wherein the connector structure supports the housings with the innermost extremities of the housings closely adjacent and overlapping a portion of the single lower tool-receiving end to thereby facilitate the close spacing of the blades on the opposite sides of the tool-receiving end;
    wherein the bracket comprises a plate member fixed to the tool-receiving end and the connector structure comprises bolts extending through apertures in the plate and though the housings; and
    wherein the tool-receiving end is generally horizontal, the plate member is supported on top of the tool-receiving end and the connector structure supports the housings generally level with a bottom of the tool-receiving end.

2. The standard assembly as set forth in claim 1 wherein the standard comprises a cushion standard oriented in a fore-and-aft direction, and the bracket defines first and second disk blade gang angles offset from the fore-and-aft direction.

3. The standard assembly as set forth in claim 1 wherein the innermost extremities lie adjacent each other and adjacent a centerline of the standard.

4. The standard assembly as set forth in claim 2 wherein the disk blades are generally equal in diameter and have leading edges that converge below a forwardmost portion of the cushion standard.

5. The standard assembly as set forth in claim 1 wherein the bolts are located on opposite sides of the tool-receiving end.

6. The standard assembly as set forth in claim 1 wherein the connector structure supports the disk blades such that the standard assembly is generally symmetrical about an upright fore-and-aft extending plane passing through the standard.

7. The standard assembly set forth in claim 6 wherein the innermost extremities lie adjacent the fore-and-aft extending plane inwardly of sides of the standard.

8. The standard assembly as set forth in claim 7 wherein the housings have a width less than twice the width of the standard.

9. A double disk standard assembly adapted for movement through the soil in a forward direction, comprising:
    an upright C-spring cushion standard having an upper mounting end and a single lower tool-receiving end;
    a bracket connected to the tool-receiving end;
    first and second single disk blade assemblies, each having a bearing supported in a housing and a spindle rotatably supported by the bearing for rotation about an axis, the spindle extending axially outwardly from the housing and supporting a disk blade;
    connector structure mounting the housings to the bracket with the disk blades angled with respect to the forward direction and spaced adjacent opposite sides of the tool-receiving end, the housings each overlapping a portion of the single lower tool-receiving end to thereby facilitate rotation of the disk blades closely adjacent the opposite sides of the tool-receiving end;
    wherein the bracket comprises a plate member fixed to the tool-receiving end and the connector structure comprises bolts extending through apertures in the plate and through the housings; and
    wherein the tool-receiving end is generally horizontal, the plate member is supported on top of the tool-receiving end and the connector structure supports the housing generally level with a bottom of the tool-receiving end.

10. The standard assembly as set forth in claim 9 wherein the C-spring cushion standard is oriented in a fore-and-aft direction and opens rearwardly, and the bracket defines opposite but generally equal first and second disk blade gang angles offset from the fore-and-aft direction so that side forces on the C-spring tend to balance out.

11. The standard assembly as set forth in claim 9 wherein the C-spring has a preselected width at the single tool-receiving end and housings have widths less than twice the preselected width and have innermost extremities which overlap and lie closely adjacent the single tool-receiving end, the innermost extremities lying adjacent each other and adjacent a centerline of the C-spring.

12. The standard assembly as set forth in claim 10 wherein the disk blades are generally vertically oriented, are equal in diameter and have leading edges that converge below a forwardmost portion of the C-spring.

13. The standard assembly as set forth in claim 9 wherein the upper mounting end includes bracket structure adapted for securing disk gang tubes together at a central location, the disk blades for working the soil below the central location.

14. The standard assembly as set forth in claim 9 wherein the connector structure supports the disk blades such that the standard assembly is generally symmetrical about an upright fore-and-aft extending plane passing through the standard.

15. The standard assembly set forth in claim 14 wherein the housings have innermost extremities which lie adjacent the fore-and-aft extending plane inwardly of sides of the standard.

16. The standard assembly as set forth in claim 15 wherein each housing has a width less than twice the width of the standard.

17. The standard assembly as set forth in claim 9 wherein the connector structure includes mounting bolts having threaded ends and the spindles include spindle bolts supporting the disk blades, wherein the spindle bolts and the mounting bolts are generally identical.

* * * * *